C. C. SMITH.
AUTOMOBILE LOADING DEVICE.
APPLICATION FILED MAY 8, 1918. RENEWED FEB. 3, 1919.
1,297,923.
Patented Mar. 18, 1919.
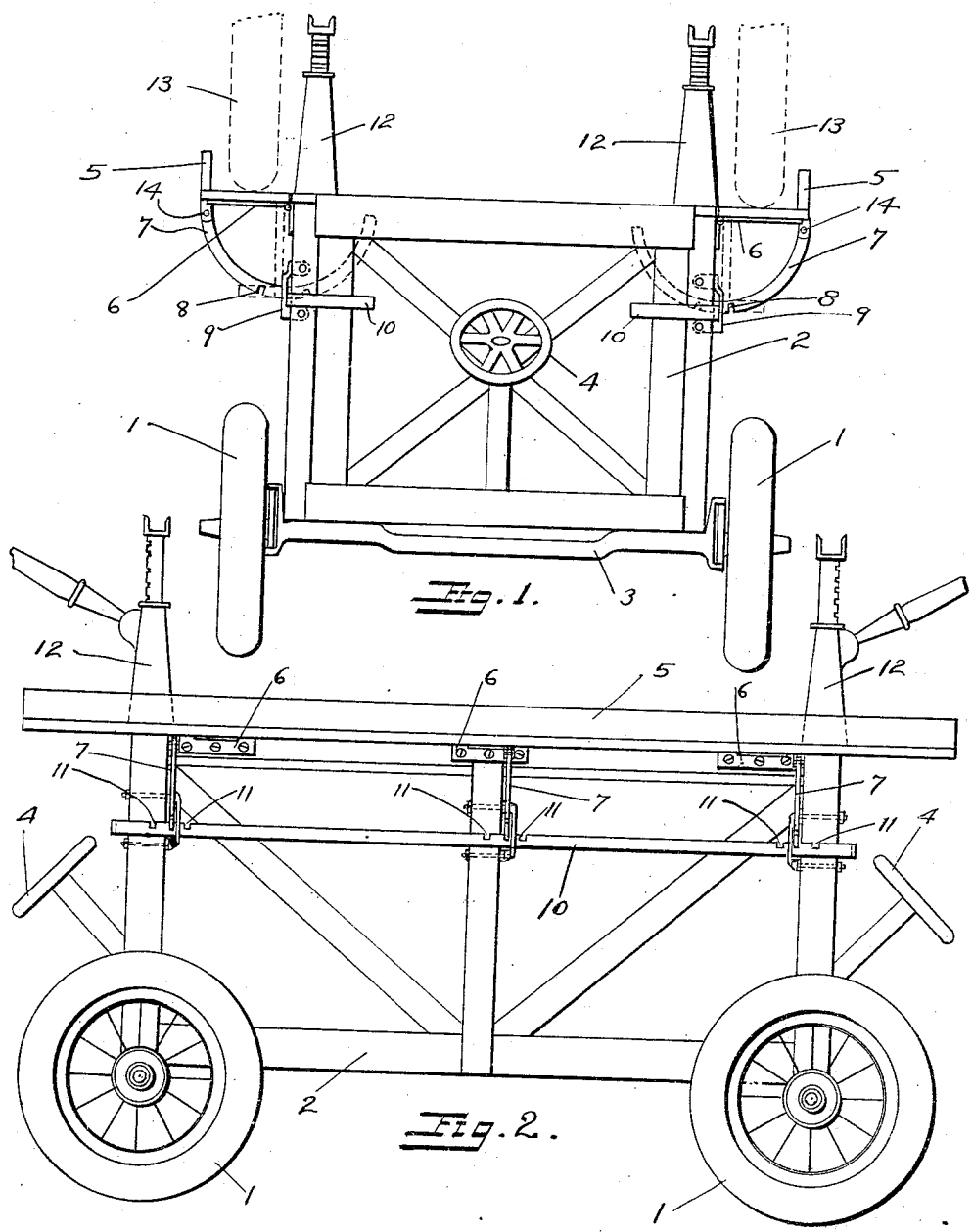

UNITED STATES PATENT OFFICE.

CARL CLYDE SMITH, OF OAKLAND, CALIFORNIA.

AUTOMOBILE-LOADING DEVICE.

1,297,923. Specification of Letters Patent. Patented Mar. 18, 1919.

Application filed May 8, 1918, Serial No. 233,367. Renewed February 3, 1919. Serial No. 274,806.

*To all whom it may concern:*

Be it known that I, CARL CLYDE SMITH, a citizen of the United States, and a resident of the city of Oakland, in the county of Alameda and State of California, (whose post-office address is No. 1802 64th avenue,) have invented new and useful Automobile-Loading Devices, of which the following is a specification.

My invention relates to a device for the loading of automobiles into railway cars after the automobiles have been fully assembled, in which a body or frame of suitable dimensions is mounted on trucks with guiding handles at each end of the frame the said frame being provided at each side with folding tracks provided with a guide rail at their outer edges; the automobile is run from a platform of suitable height on to these tracks. Jack screws are mounted at each of the four corners of the said frame so as to be in alinement with the four axles of the automobile; the automobile is then raised off of the said tracks by the manipulation of the jacks and the folding track is released and is swung away from the wheels of the automobile; the wheels are then removed and stored away for convenient shipment.

The object of my invention is to provide an easy, cheap and convenient method of handling automobiles for the purpose of shipment.

Another object of my invention, is to provide a more economical method of loading automobiles into railway cars.

Still another object of my invention is to save labor in the handling and loading of automobiles into railway cars.

I attain these objects by the mechanism illustrated in the accompanying drawing, in which:

Figure 1 is an end view of my device, showing the folding tracks in place and an outline of the automobile wheels resting thereon, also the jack screws by means of which the machine is raised away from the said tracks.

Fig. 2 is a side elevation showing the method of operating the said jack screws and the method of dropping the tracks to permit the removal of the wheels.

Similar figures refer to similar parts throughout the several views.

1 1, are the wheels of the truck on which the device is mounted in this case and as I prefer, are two front axles of an automobile, with the steering wheel reversed; one of which supports the frame of the device at each end; 2, is the frame, 3 is the axle of the truck; 4 is the steering wheel by which the device is operated, 5 is the guide rail extending along the outside edge of the folding track; 6 is a strap hinge supporting the folding tracks; 7 is a semi-circular brace hinged at its upper end and attached by suitable means to the outer edge of folding track 5; 8 is a notch in the lower end of the said brace, which is designed to slide within the said frame when the folding tracks are lowered, the said notch engaging with sliding bar 10 when the said tracks are in position for use; 9 is a bracket supporting sliding bar 10; 11 is a notch in sliding bar 10 to guide brace 7; 12 is a jack, which may be either of the screw or ratchet type, one of which is mounted on each of the four corners of frame 2; 13 is the outline of the automobile wheel as it is seen when in place on the loading device and in readiness to be moved into the railway car; 14 is the hinge by which brace 7 is attached to the outer edge of folding track 5.

Having now described my invention, that which I claim to be new and desire to secure by Letters Patent is:

1. A loading device for automobiles, comprising a four wheeled truck, a frame mounted thereon, a jack of suitable design mounted at each of the four corners of the said frame, a track, platform or runway extending along either side of the said frame at the top thereof and outside of said jacks; the said track or runway being hinged to the top of the said frame at its inner edge and supported at its outer edge by an adjustable arm, so that it may be folded down, away from the wheels of the automobile as shown.

2. A loading device for automobiles, comprising a truck with four wheels, a steering handle attached to the axle at each end, a frame mounted on the said truck, a jack of suitable design mounted on top of each of the four corners of the said frame, a track or runway extending along the outside of the said frame on both sides thereof and fastened thereto by suitable hinges; the said tracks or runways being supported at their outer edges by adjustable arms or braces; the said braces being notched at their lower ends so as to engage with corresponding notches in a supporting bar, slidably mounted along the sides of the said frame, as shown.

3. In combination a loading device for automobiles, comprising a truck with four wheels, a steering handle attached to the axle of the said truck at each of its ends, a frame mounted on the said truck, a jack of suitable design mounted on the top of each of the four corners of the said frame, a track or runway for the wheels of an automobile adjustably attached to each side of the said frame at the top thereof and outside of the said jacks; the same being adjustably supported by braces or arms suitably hinged to the outer edges thereof, the said arms or braces being supported at their lower ends by supporting bars slidably mounted along the sides of said frame and held in place by suitable brackets as shown.

CARL CLYDE SMITH.

Copies of this patent may be obtained for five cents each, by addressing the "Commissioner of Patents, Washington, D. C."